Jan. 31, 1967  R. E. BRATTON  3,301,236

ROTARY VALVE INTERNAL COMBUSTION ENGINE

Filed Oct. 5, 1964  3 Sheets-Sheet 1

INVENTOR.
ROBERT E. BRATTON
BY Whittemore
Hulbert & Belknap
ATTORNEYS

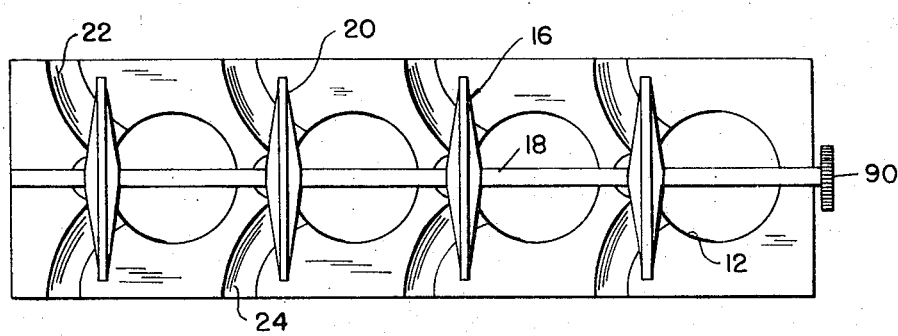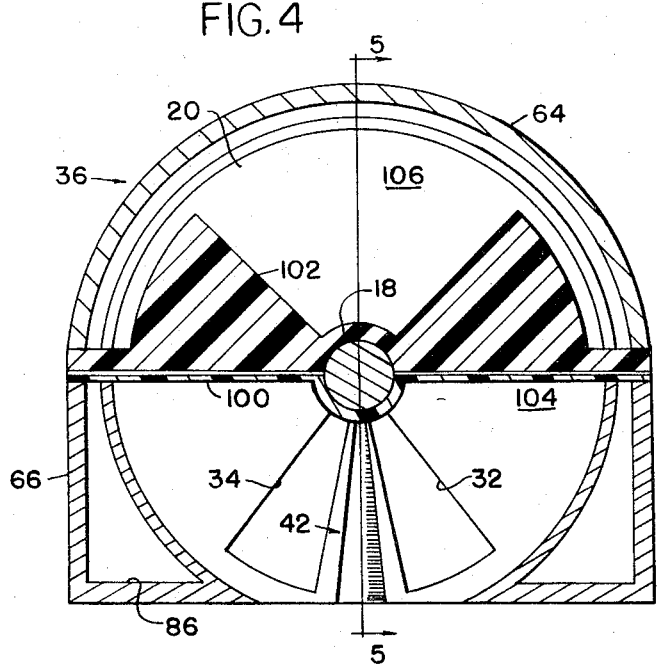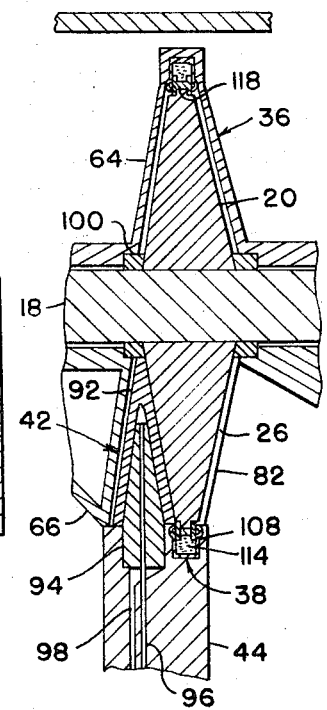

*INVENTOR.*
ROBERT E. BRATTON
BY Whittemore
Hulbert & Belknap
ATTORNEYS

United States Patent Office 3,301,236
Patented Jan. 31, 1967

3,301,236
ROTARY VALVE INTERNAL COMBUSTION ENGINE
Robert E. Bratton, 5355 Lane Lake Road, Bloomfield Hills, Mich. 48228
Filed Oct. 5, 1964, Ser. No. 401,512
11 Claims. (Cl. 123—59)

The invention relates to internal combustion engines and refers more specifically to rotary valve structure for reciprocating type internal combustion engines.

In the past the usual valve structure for reciprocating internal combustion engines has been poppet valves opened by movement mechanically inwardly of a cylinder in which they are placed by means of a rocker arm actuated by a push rod which in turn has been actuated by hydraulic lifters or the like driven from a cam shaft in synchronism with the operation of the engine. Valve return has usually been by spring means.

This usual poppet type of valve mechanism is undesirable in that considerable power is necessary to overcome the resistance to opening of the valves against cylinder pressure which produces wear in the valve system. Further, the members of the valve system are reciprocating so that power is dissipated in overcoming the inertia of the members in changing the directions thereof. Such valve structure also requires additional hood height and is inefficient at high speeds. Further, since the valves in the structure are constantly exposed to the high temperatures of the ignited fuel in the cylinders, burning of the valves at sustained high speed is possible.

Where rotary valves have been used in the past in conjunction with internal combustion engines they have been deficient in that proper sealing without objectionable friction has not been obtained therein. Further, the expansion of the rotary valves due to temperature changes has not been sufficiently taken into account and distortion, deflection and/or flutter has often occurred in the operation of prior rotary valve structure.

It is therefore an object of the present invention to provide improved rotary valve structure.

Another object is to provide rotary valve structure including means for permitting valve expansion due to temperature changes in operation.

Another object is to provide rotary valve structure including improved means for peripheral lubrication of the valves in operation.

Another object is to provide rotary valve structure including a one-piece value shaft having multiple valve discs spaced apart axially therealong.

Another object is to provide rotary valve structure wherein the valve area exposed to cylinder pressure is small and the valve structure is supported immediately behind the valve area exposed to cylinder pressure.

Another object is to provide rotary valve structure including expandable peripheral sealing structure for compensating for radial expansion of the valve structure.

Another object is to provide rotary valve structure including improved sealing means.

Another object is to provide rotary valve structure including a semi-solid peripheral lubricant.

Another object is to provide rotary valve structure in which the valve discs rotate with a large portion of the area thereof free from contact with adjacent structure.

Another object is to provide rotary valve structure which is simple in construction, economical to manufacture and efficient in use.

Other objects and features of the invention will become apparent as the description proceeds, especially when taken in conjunction with the accompanying drawings, illustrating a preferred embodiment of the invention, wherein:

FIGURE 3 is a diagrammatic representation of one head structure of the engine structure illustrated in FIGURES 1 and 2 showing the rotary valve structure in conjunction with engine cylinders and the fuel and air intake and combustion gas exhaust passages.

FIGURE 4 is an enlarged transverse cross section of one of the head structures of the engine of FIGURE 1 showing the valve structure taken substantially on the line 4—4 in FIGURE 2.

FIGURE 5 is a transverse section view of the engine head and valve structure illustrated in FIGURE 4 taken substantially on the line 5—5 in FIGURE 4.

With particular reference to the figures of the drawings, one embodiment of the present invention will now be considered in detail.

Figure 1:
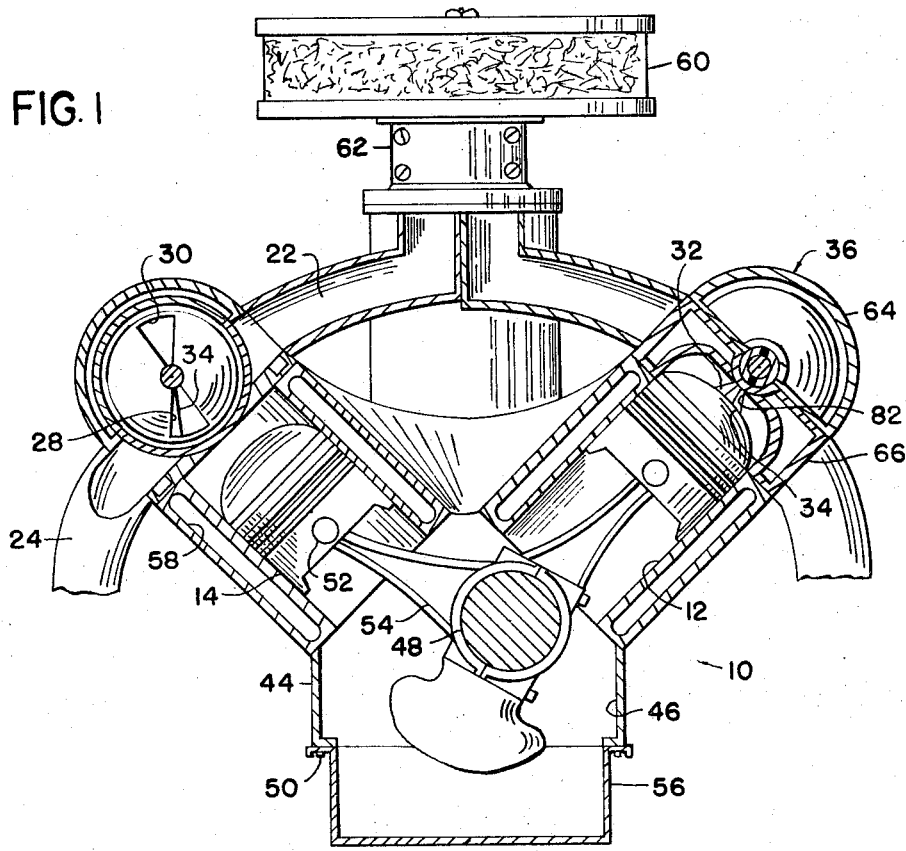
FIGURE 1 is a diagrammatic cross section view of an internal combustion engine including rotary valve structure constructed in accordance with the invention.
Figure 2:
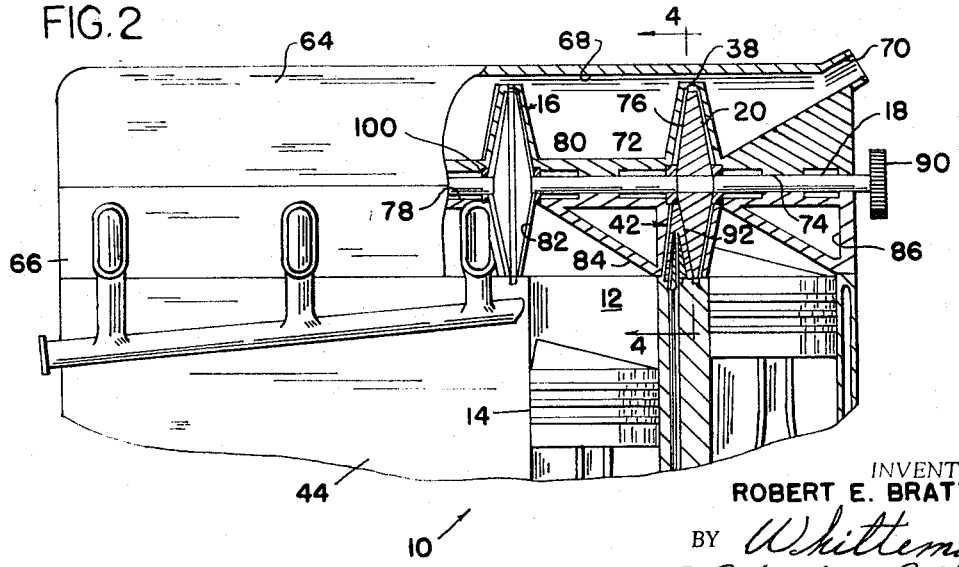
FIGURE 2 is a partial side elevation, partially broken away, of the engine illustrated in FIGURE 1 particularly showing the rotary valve structure of the invention.
Figure 6:
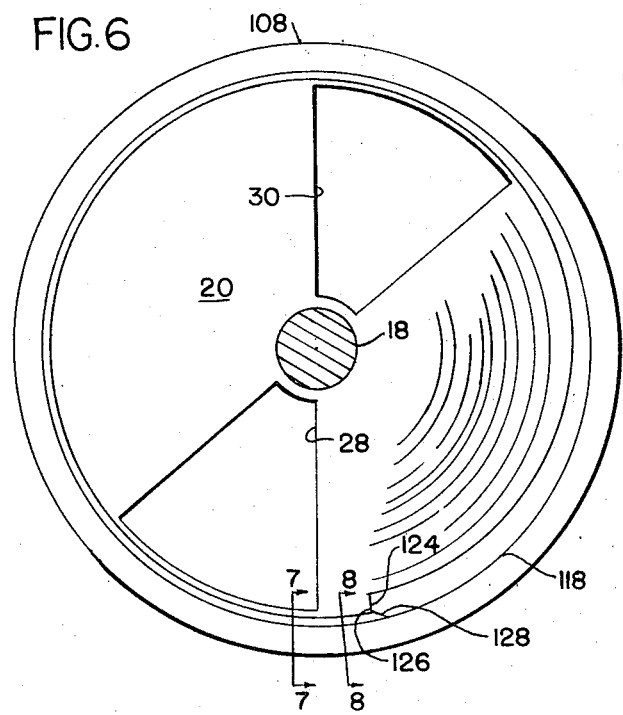
FIGURE 6 is an enlarged transverse section of a portion of the valve structure of the engine illustrated in FIGURES 1 and 2.

As shown best in FIGURES 1 and 2, the internal combustion engine 10 which includes a plurality of cylinders 12 and pistons 14 is provided with rotary valve structure 16 constructed in accordance with the invention. The rotary valve structure 16 includes the integral valve shaft 18 and valve discs 20.

In operation the valve shaft 18 is rotated in accordance with the speed of the engine 10 to periodically and sequentially connect each cylinder 12 with the associated fuel intake passage 22 and combustion gas exhaust passage 24 through opening 26 in the cylinder 12, one of the openings 28 and 30 of a valve disc 20 and the port 32 or 34 in an engine head structure 36.

During this operation the valve discs 20 are lubricated by the peripheral lubricating structure 38 which also allows for radial expansion of the valve discs 20 due to the provision of the peripheral expansion ring 40 included therein. Further the valve discs 20 are supported between the intake and exhaust ports 32 and 34 by means of the lubricated conical bearing structure 42.

More specifically, the engine 10 illustrated in FIGURES 1 and 2 includes the block 44 having the cylinders 12 and crankcase 46 therein. The crankshaft 48 is mounted for rotation in block 44.

The pistons 14 are positioned in the cylinders 12 for reciprocation therein in the usual manner on rotation of crankshaft 48. The pistons 14 are connected to the crankshaft 48 through wrist-pins 52 and connecting rods 54.

The usual oil pan 56 is secured to the engine block 44 by convenient means, such as bolt 50. An oil pump (not shown) may be provided in the crankcase 46 for circulating oil through the engine as required for lubrication. Further water cooling may be provided through the passages 58 in the motor block 44 in the usual manner.

Engine 10 further includes the air cleaner 60 and carburetor 62 for passing an air-fuel mixture into the fuel intake passages 22 of engine 10. The exhaust passages 24 are provided to funnel combustion gases away from the engine 10.

All of the structure described immediately above in engine 10 may be found in the usual internal combustion engine. Additional details thereof will not therefore be included herein. Further, the cyclical operation of the piston 14 and cylinder 12 and the resulting fuel intake, compression, ignition and exhaust strokes of the piston in the usual internal combustion engine are well known and will not be considered in detail.

The rotary valve structure 20, constructed in accordance with the invention, is provided in conjunction with the engine head structure 36 which may be bolted to the engine block 44 at opposite sides thereof by convenient means (not shown). As is shown best in FIGURES 2 and 4 each head structure 36 is split horizontally to provide an upper semicircular portion 64 and a lower rectangular portion 66.

The upper semi-circular portion 64 of head structure 36 is hollow to provide a water cooling chamber 68 through which water may be flushed from the usual radiator (not shown) through the hose coupling 70. The lower surface of the semicircular member 64 of the head structure 36 is provided with a longitudinally extending recess 72 therein having bearing portions 74 spaced longitudinally thereof for rotatably receiving one-half of the valve shaft 18. Further, semicircular recesses 76 are provided in the lower surface of the semi-circular portion 64 of head structure 36 to receive the valve discs 20 for rotation therein.

The lower rectangular portion 66 of head structure 36 is provided with a recess 78 in its upper surface having bearing portions 80 therein for rotatably receiving the lower half of the valve shaft 18. Thus, the bearing portions 74 and 80 support the valve shaft 18 for rotation. The rectangular portion 66 of head structure 36 is provided with semicircular recesses 82 in the upper surface thereof to receive the other half of valve disc 20.

The lower surface of the rectangular portion 66 of head structure 36 provides an upper wall 84 for cylinders 12 which as shown is sloped toward the ports 32 and 34 provided in conjunction with each cylinder 12 in communication with the associated intake passage 22 and exhaust passage 24 respectively. The port 82 into the cylinder 12 is aligned with ports 32 and 34 and the upper end of piston 14 is sloped in the same direction as the upper wall of the cylinder 12. Water cooling passages 86 are further provided in the rectangular portion 66 of head structure 36.

Each valve structure 16, as shown best in FIGURE 2, in the engine 10 includes the valve shaft 18 having four valve discs 20, circular in transverse cross section and tapered inwardly radially outwardly, spaced longitudinally thereof and constructed integrally therewith. The valve shaft and valves may be of a suitable molded pyroceramic having shock resistant properties which is dimensionally stable. Stainless steel and aluminum are also suitable material from which the valve shaft and valves may be constructed. The valve structure 16 may be rotated about the axis of valve shaft 18 in synchronism with the engine 10 by means of a chain or belt drive to the drive pulley or gear 90 secured to the shaft 18.

Figure 9:
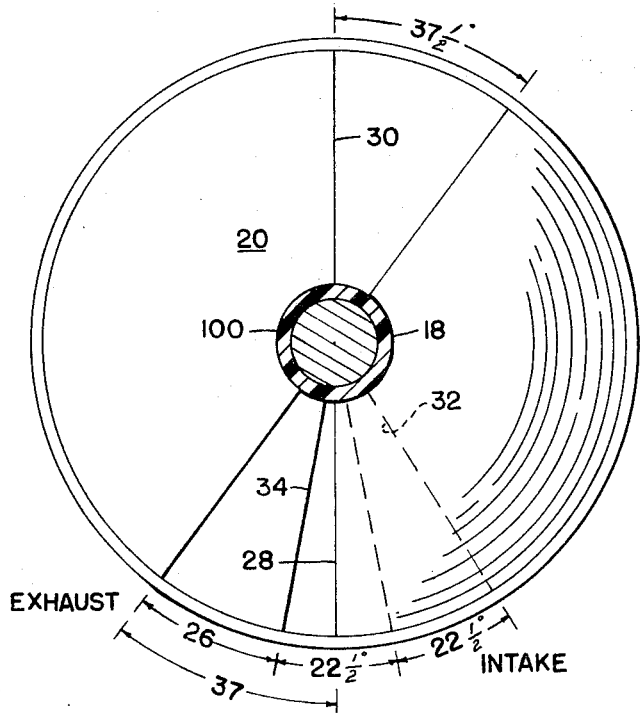
FIGURE 9 is a diagrammatic representation of the valve structure of the engine illustrated in FIGURES 1 and 2 particularly showing the relation between the valve opening in the rotary valve member and the intake and exhaust openings to the intake and exhaust passages of the engine illustrated in FIGURES 1 and 2 with the dwell time being indicated.

Each valve disc 20 is provided with oppositely disposed radially and angularly extending ports 28 and 30, extending axially therethrough. As shown in FIGURE 9, the ports 28 and 30 extend angularly approximately thirty-seven and one-half degrees around valve disc 20 while the ports 32 and 34 in the rectangular portion 66 of the head structure 36 extend for twenty-six degrees and twenty-two and one-half degrees respectively. Thus, as each port 28 rotates first past the intake port in the head structure 36, it opens the associated cylinder 12 through the opening 82 in the head structure to the fuel and air mixture from the fuel and air intake passage 22. As the valve disc 20 continues to rotate the valve disc 20 provides an overlap of fifteen degrees wherein both the exhaust passage 24 and fuel intake passage 22 are in communication with the cylinder 12 through the opening 82 and the port 28. Thus the dwell angle for a valve disc 20 is twenty-two and one-half degrees.

The valve structure 18 is sealed in its rotary motion by the seals 100 and 102 which may be, for example, Teflon. Thus, the chamber 104 in the lower portion 66 of head structure 36 which may be exposed to combustion pressures is sealed from the upper head structure portion chamber 106.

Figure 7:
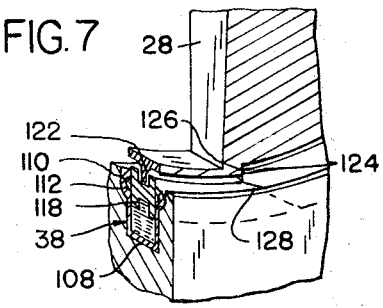
FIGURE 7 is an enlarged isometric view of a portion of the valve structure illustrated in FIGURE 6 taken substantially on the line 7—7 in FIGURE 6.
Figure 8:
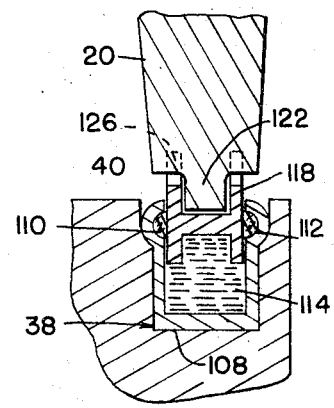
FIGURE 8 is a transverse section view of the valve structure illustrated in FIGURE 6 taken substantially on the line 8—8 in FIGURE 6.

Lubrication is provided for the outer periphery of each of the valve discs 20 by the peripheral lubricating structure 38 illustrated best in FIGURES 7 and 8. The peripheral lubricating structure 38 includes the annular member 108 which is substantially U-shaped in cross section, as shown in FIGURE 8, and which has the arcuate portions 110 at the outer ends of the legs of the cross section thereof. Suitable packing material 112 is positioned in the arcuate portions 110 of the legs of the cross section of the member 108 to seal the semi-solid lubricant 114 between the member 108 and the peripheral expansion ring 118 of the valve discs 20. The semi-solid lubricant 114 may be for example a graphite mixture or a silicon grease which may be supplied in the member 108 by an external grease fitting (not shown) extending through the head structure 36 if desired.

The peripheral expansion ring 118 is H-shaped in cross section, as shown best in FIGURE 8, and receives a tongue 122 formed on the periphery of the valve disc 20. The valve discs 20 are provided with a stepped outer periphery which provides the abutment 124 engageable with the abutment 126 on the expansion ring 118 whereby the ring 118 is rotated with the valve disc 20.

The expansion ring 118 is split along a line 128 at an angle to the radius of the valve 20 so that the ring 118 may expand or contract with the periphery of the valve disc 20 with no substantial loss of seal at the periphery of the valve disc 20.

As the valve discs rotate they are supported by the conical bearing support structure 42. As shown best in FIGURES 4 and 5 a conical bearing support structure 42 is positioned behind each valve disc 20 between the exhaust and intake opening in the lower portion 66 of the head structure 36. Thus the conical bearing support structure 42 provides reinforcement for the valve discs 20 to prevent deflection and flutter thereof in operation. The conical bearing support structure 42 and more specifically the cone bearing 92 also serve as an efficient seal between the ports 32 and 34.

The conical valve structure 42 includes the cone bearing 92 which may be of, for example oil impregnated sintered bronze. The cone bearing 92 is positioned on the cone bearing support 94 which may be secured in the engine block 44 by convenient means (not shown). Lubrication between the bearing support 94 and bearing 92 is provided through oil line 96 extending centrally of the conical bearing support in conjunction with the oil return line 98. Thus oil may be forced through the oil line 96 and allowed to drain into the oil return line 98 over the surface of the bearing support 94 which may have oil return grooves in the surface thereof. Ball bearings may be provided between the bearing support 94 and bearing 92 to facilitate rotation of the bearing on the bearing support.

Thus, in over-all operation of the engine 10, the two valve structures 18 which provide a valve disc 20 for each of the eight cylinders of the engine 10 are rotated in synchronism with the engine at, for example, one-fourth the speed of the engine to rotate a port 28 or 30 past the required intake and exhaust ports 32 and 34 to provide timed predetermined valving for the cylinders 12 in conjunction with the opening 82 of each cylinder 12 synchronized with the operation of the pistons 14 in the cylinders 12 and the usual internal combustion engine ignition system.

During such operation it will be particularly noted that with the structure disclosed there is minimum thrust on the valve discs axially of shafts 18 due to low exposure thereof to the cylinders 12 since opening 82 is of limited angular extent determined by the angular extent of ports 28 and 30 so that valve flutter, deflection and distortion is minimized in conjunction with the conical bearing structure 42 positioned behind the valves centrally of the exposed area thereof. Further, the semi-solid lubricant 114 and the sealing ring 108 in conjunction with the peripheral expansion ring 118 of the valve discs 20 provide desired peripheral lubrication of the valve discs 20 without loss of lubricant into the cylinders. The peripheral expansion ring 118 of the valve discs 20 also provide for radial expansion of the valve discs due to temperature change in operation whereby the major difficulties of prior rotary valve structures are overcome.

Also, it will be noted that with the disclosed valve structure 16 that the valve discs 20 rotate in clearance except where there is contact with the conical bearing 92, the self lubricated plastic sealing material 100 and 102 and the peripheral lubricating structure 38. This structure permits rotation of valve discs 20 with almost no friction.

While one embodiment of the present invention has been considered in detail, it will be understood that other embodiments and modifications thereof are contemplated. It is the intention to include all embodiments and modifications as are defined by the appended claims within the scope of the invention.

What I claim as my invention is:

1. In an internal combustion engine a cylinder, means defining a pair of ports in communication with said cylinder at one end of said cylinder and at the side thereof which ports are adjacent each other and are disposed in the same surface of revolution, a rotary valve having a port therein registrable sequentially with said pair of ports, an elongated rotary bearing intermediate said pair of ports engageable with said valve on the side thereof away from the cylinder and a piston reciprocal within the cylinder.

2. In an internal combustion engine a cylinder, means defining a pair of ports in communication with said cylinder at one end of said cylinder and at the side thereof which ports are adjacent each other and are disposed in the same surface of revolution, the one end of the cylinder being inclined to slope toward said ports, a rotary valve having a port therein registrable sequentially with said pair of ports, an elongated rotary bearing intermediate said pair of ports engageable with said valve on the side thereof away from the cylinder and a piston reciprocal within the cylinder.

3. In an internal combustion engine a cylinder, means defining a pair of ports at one end of the cylinder in the same surface of revolution, a piston reciprocally mounted in the cylinder and a rotary valve disc having a port therein registrable sequentially with said pair of ports on rotation thereof positioned at the surface of revolution, and means for lubricating the periphery of the valve disc in operation comprising an annular member having an inwardly opening U-shaped cross section for receiving the edge of the valve disc, a semi-solid lubricant within the U-shaped cross section and packing means at the outer ends of the U-shaped cross section of the annular member for retaining the semi-solid lubricant within the annular member.

4. in an internal combustion engine a cylinder, means defining a pair of ports at one end of the cylinder in the same surface of revolution, a piston reciprocally mounted in the cylinder and a rotary valve disc having a port therein registrable sequentially with said pair of ports on rotation thereof positioned at the surface of revolution and means for permitting radial expansion of the valve disc during operation comprising an annular tongue on the outer periphery of the valve disc, an annular peripheral expansion ring split in two on a line extending transversely to the adjacent radius of the valve disc and having an H-shaped cross section with one end thereof receiving the peripheral tongue of the valve disc.

5. In an internal combustion engine a cylinder, means defining a pair of ports at one end of the cylinder in the same surface of revolution, a piston reciprocally mounted in the cylinder and a rotary valve disc having a port therein registrable sequentially with said pair of ports on rotation thereof positioned at the surface of revolution and means for supporting said valve disc between said ports exterior of said cylinder comprising a conical bearing positioned between the ports on the side of the valve disc away from the cylinder and means for rotatably mounting and lubricating said conical bearing.

6. In an internal combustion engine a plurality of transversely aligned, spaced apart cylinders, means defining a separate pair of ports in a single surface of revolution in communication with each of said cylinders, a piston reciprocal within each of said cylinders, rotary valve structure including a single valve shaft having axially spaced apart integral valve discs in conjunction therewith one of which is disposed in the surface of revolution associated with each of the aligned cylinders, each valve disc having a port therein registrable sequentially with the pair of ports in the surface of revolution associated therewith on rotation of the valve shaft, means for lubricating the periphery of the valve disc in operation comprising an annular member having an inwardly opening U-shaped cross section for receiving the edge of the valve disc, a semi-solid lubricant within the U-shaped cross section and packing means at the outer ends of the U-shaped cross section of the annular member for retaining the semi-solid lubricant within the annular member, means for permitting radial expansion of the valve disc during operation, and means for supporting said valve disc between said ports exterior of said cylinder.

7. In an internal combustion engine a plurality of transversely aligned, spaced apart cylinders, means defining a separate pair of ports in a single surface of revolution in communication with each of said cylinders, a piston reciprocal within each of said cylinders, rotary valve structure including a single valve shaft having axially spaced apart integral valve discs in conjunction therewith one of which is disposed in the surface of revolution associated with each of the aligned cylinders, each valve disc having a port therein registrable sequentially with the pair of ports in the surface of revolution associated therewith on rotation of the valve shaft, means for lubricating the periphery of the valve disc in operation, means for permitting a radial expansion of the valve disc during operation comprising an annular tongue on the outer periphery of the valve disc, an annular peripheral expansion ring split in two on a line extending transversely to the adjacent radius of the valve disc and having an H-shaped cross section with one end thereof receiving the peripheral tongue of the valve disc, and means for supporting said valve disc between said ports exterior of said cylinder.

8. In an internal combustion engine a plurality of transversely aligned, spaced apart cylinders, means defining a separate pair of ports in a single surface of revolution in communication with each of said cylinders, a piston reciprocal within each of said cylinders, rotary valve structure including a single valve shaft having axially spaced apart integral valve discs in conjunction therewith one of which is disposed in the surface of revolution associated with each of the aligned cylinders, each valve disc having a port therein registrable sequentially with the pair of ports in the surface of revolution associated therewith on rotation of the valve shaft, means for lubricating the periphery of the valve disc in operation, means for permitting radial expansion of the valve disc during operation, and means for supporting said valve disc between said ports exterior of said cylinder comprising a conical bearing positioned between the ports on the side of the valve discs away from the cylinder and means for rotatably mounting and lubricating said conical bearing.

9. Structure as defined in claim 2 in which the end of the piston adjacent the one end of the cylinder is inclined to slope in the same direction as the one end of the cylinder.

10. Structure as set forth in claim 2 wherein both said valve and rotary bearing have conical surfaces in contact with each other.

11. Structure as set forth in claim 4 wherein the peripheral expansion ring is provided with a radially inwardly extending abutment at the split therein and the valve disc is provided with a radially outwardly extending abutment engageable with the abutment on the peripheral expansion ring whereby said peripheral expansion ring is driven by the valve disc.

References Cited by the Examiner
UNITED STATES PATENTS

| | | | |
|---|---|---|---|
| 1,108,916 | 9/1914 | Lembke | 123—59 |
| 1,130,427 | 3/1915 | O'Neal | 123—190 |
| 1,385,099 | 7/1921 | Stevens | 123—59 |
| 1,751,528 | 3/1930 | Peterson et al. | 123—59 |
| 1,910,561 | 5/1933 | Pierce | 123—73 |
| 2,412,260 | 12/1946 | Hall | 123—190 |

MARK NEWMAN, *Primary Examiner.*

WENDELL E. BURNS, *Examiner.*